United States Patent [19]
Ono et al.

[11] 4,184,235
[45] Jan. 22, 1980

[54] APPARATUS FOR SHAPING ANODES

[75] Inventors: Masaharu Ono, Tokyo; Hirofumi Kurokawa, Koganei; Kimio Yoshida, Osaka; Tadashi Itado, Osaka; Yasuhiro Uchihara, Osaka, all of Japan

[73] Assignees: Sumitomo Metal Mining Co., Tokyo; Fuji Sangijo Co., Ltd., Osaka, both of Japan

[21] Appl. No.: 937,587

[22] Filed: Aug. 28, 1978

Related U.S. Application Data

[63] Continuation-in-part of Ser. No. 781,342, Mar. 25, 1977, abandoned.

[30] Foreign Application Priority Data

Feb. 15, 1977 [JP] Japan .................................. 52-15393

[51] Int. Cl.² ........................... B23P 23/00; B23D 7/08
[52] U.S. Cl. ..................................... 29/33 R; 198/477; 198/681; 409/147; 409/203; 409/227
[58] Field of Search ..................... 29/564, 33 R, 33 A; 90/11 R, 15 R, 21 A, 21 R; 198/477, 681, 678

[56] References Cited

U.S. PATENT DOCUMENTS

| | | | |
|---|---|---|---|
| 1,838,816 | 12/1931 | Ficket et al. .......................... | 90/15 R |
| 2,609,083 | 9/1952 | Leach .................................... | 198/477 |
| 3,058,604 | 10/1962 | Harper et al. ..................... | 198/477 X |
| 3,082,495 | 3/1963 | Miller, Jr. .......................... | 198/477 X |
| 3,202,261 | 8/1965 | Pianowski .............................. | 198/477 |
| 3,457,830 | 7/1969 | Menissier .............................. | 90/15 R |
| 3,983,786 | 10/1976 | Bähr et al. ............................ | 90/15 R |
| 4,020,944 | 5/1977 | Kojima et al. ..................... | 198/678 X |

FOREIGN PATENT DOCUMENTS

| | | | |
|---|---|---|---|
| 473984 | 9/1975 | Australia .................................. | 198/681 |
| 2515678 | 1/1976 | Fed. Rep. of Germany .......... | 90/15 R |

*Primary Examiner*—William R. Briggs
*Attorney, Agent, or Firm*—Watson, Cole, Grindle & Watson

[57] ABSTRACT

An apparatus for shaping anodes for electrolytic refining in the form of flat plates having support ears extending outwardly of a top edge and opposite side edges thereof, the apparatus including a receptacle for holding the plates parallel, vertical and spaced apart, vertically movable beams engaging the ears for supporting the plates, shaping devices movable toward and away from opposing sides of the receptacle for shaping the under-surfaces of the support ears, and a device movable vertically and horizontally for transferring the plates into the receptacle for being shaped and for transferring the shaped plates from the receptacle, whereby the support ears may be shaped concurrently for improving the contact of the anodes with bus bars.

10 Claims, 14 Drawing Figures

APPARATUS FOR SHAPING ANODES

RELATED APPLICATION

This application is a continuation-in-part of co-pending application Ser. No. 781,342, filed 3/25/77, now abandoned.

BACKGROUND OF THE INVENTION

1. Field of the Invention

The present invention relates to an apparatus for shaping anodes to be employed in the electrolytic refining of metals.

2. Description of the Prior Art

For carrying out an electrolysis operation in the electrolytic refining of metals, the electrolytic plant should have a large capacity and at the same time the clearance between an anode and a cathode in the cells should be minimized.

Figure 1:
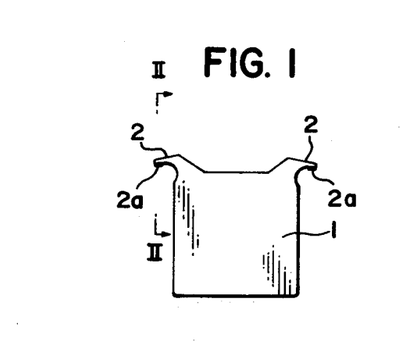
FIG. 1 shows a front view of an anode made according to the prresent invention.
Figure 2:
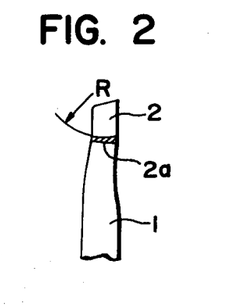
FIG. 2 is an enlarged partial side view of the anode taken along line II—II of FIG. 1.

Crude copper, crude nickel, crude lead and the like are cast to form rectangular plates having support members or ears protruding outwardly from opposing side edges at an upper edge thereof, the support ears being suspended on longitudinal flange portions at the upper portion of the cell and the cast plates being electrolyzed as the anodes. Such anode plates are prepared by casting a molten material onto recessed molds having a shape as shown in FIG. 1, and placed horizontally to enable the casting in the simplest manner, cooling the surface of the cast material by spraying water thereon and stripping the solidified cast material from the molds. In order to facilitate the removal of the cast plates from the molds, the side walls of the recess in the molds are inclined outwardly so that the sides of the cast anode are sloped.

Refined thin metal sheets are suspended vertically in the cells as the cathodes. When each anode cast, as stated above, is suspended between the two cathodes by being supported on the longitudingal flanges of the cell by its support ears, the undersurfaces of the ears are not perpendicular to the surface walls of anodes but are inclined with respect thereto. Accordingly, when the anodes are supported on the longitudinal flanges of the cell, the bottom surfaces are out of full contact therewith since only edges having acute angles on bottom surfaces contact the flanges. Therefore, the anodes cannot be placed vertically in position but must be inclined to the vertical. Hence, the clearance between the anode and the cathode at the lower portion differs from that at the upper portion. During the electrolysis operation, such an inclination causes a difference in the dissolving rate at the upper and lower portions. Hence the cast anodes cannot be fully exhausted and the remaining portion must be cast again for the re-use; thus, the utility efficiency of the anodes is markedly reduced. In addition, in order to avoid a direct contact of the anode with the cathode because of the inclined anodes, the clearance between an anode and a cathode should be maintained larger for the purpose of safety than would be maintained if the anode were suspended vertically in position. This, however, results in a reduced utility of the electrolytic cell.

In order to eliminate such problems, the positioning of the support ears or members has been positively adjusted by inserting copper liners or the like below the undersurfaces thereof so that the anode is suspended vertically in position. However, such an adjustment requires much time and labor.

In order to reduce such labor, the shape of the molds has been improved so that the undersurfaces are perpendicular to the parallel side surfaces to be electrolyzed, or so that the inclination of the undersurfaces of one support member is reversed relative to that of another support member. However, as the casting accuracy of the anode plates cannot be controlled precisely because of the simple casting procedure involved, it has been difficult to overcome such problems by such a control in the shape of the cast anodes. In addition, the surface of the cast anodes is so rough that the electric resistance between an anode and a bus bar becomes so high as to significantly reduce the electrolysis efficiency.

SUMMARY OF THE INVENTION

For overcoming such problems, the undersurfaces of the support ears or members of the anodes are worked, in accordance with the invention, by shaping them to provide an arcuate surface having a radius R of which the center lies substantially on the centerline of the thickness of the anodes so that the anodes hang vertically in position when their support ears or members are suspended on the flanges of the cell.

A primary object of the present invention is to provide an apparatus for efficiently shaping anode plates in that the undersurfaces of support ears of a plurality of anode plates are concurrently shaped to increase the number of the plates to be worked per unit time, and to reduce the installation space as well as the investment and running costs as an accessory for a large scale electrolytic plant.

According to the present invention, the apparatus for shaping anode plates includes a receptacle having a plurality of vertical walls with a height and a width slightly greater than that of the anodes so as to define channels in equally spaced relation for the reception of the plates having their support ears extending outwardly of opposing side edges of the walls, the plates being clamped against adjacent wall surfaces. Shaping devices are disposed at the lateral sides of the receptacle, such devices having cutters movable toward and away from the receptacle to concurrently shape the undersurfaces of the support ears or members of a plurality of anodes. And, a vertically and horizontally movable transfer device effects the transfer of a plurality of anodes to and from the channel of the receptacle.

DETAILED DESCRIPTION OF PREFERRED EMBODIMENTS

Figure 3:
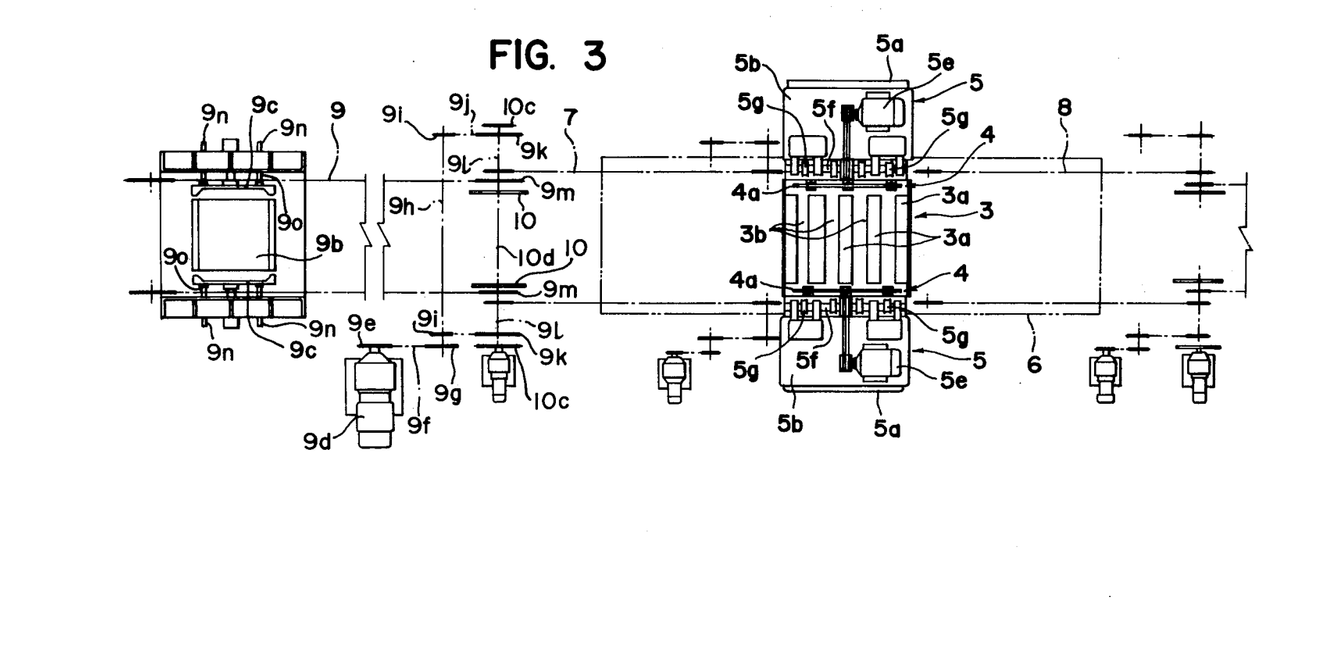
FIG. 3 is a plan view of an embodiment of the shaping apparatus according to the present invention.
Figures 4A, 4B:
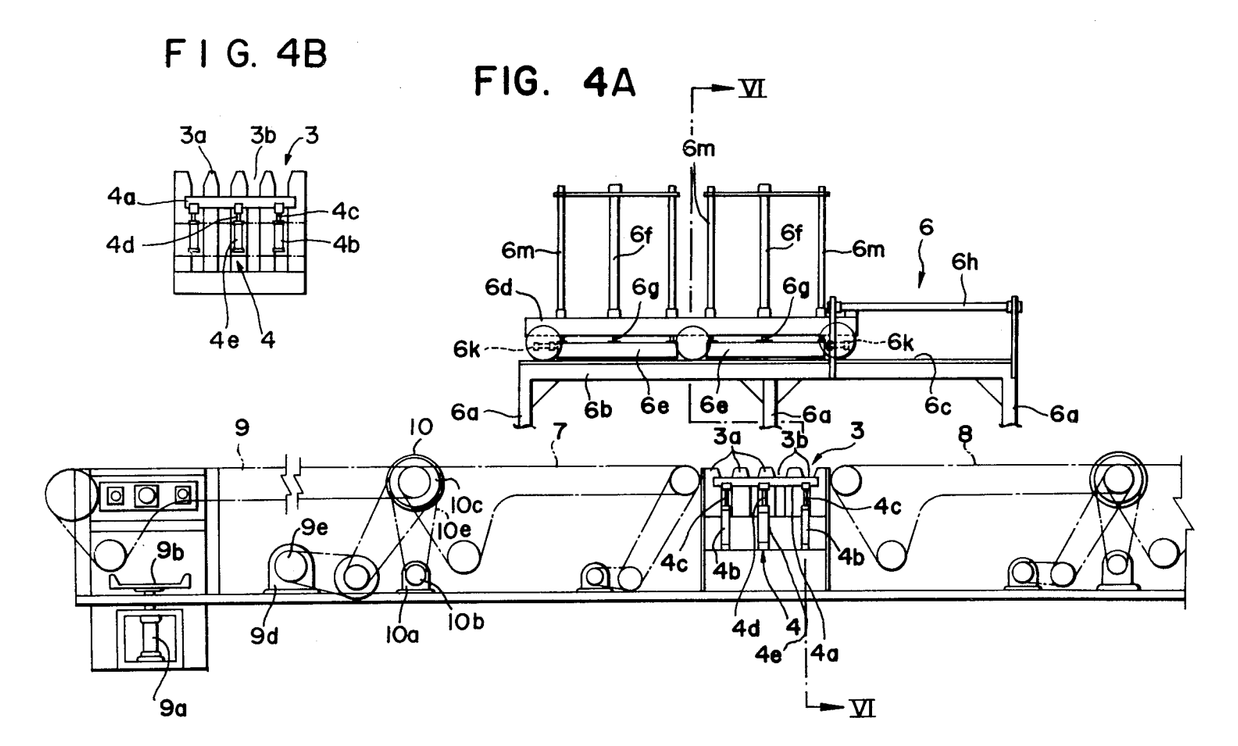
FIG. 4A is a side view of FIG. 3.
FIG. 4B is a side view of the receptacle of FIG. 4A showing the anode support beams.
Figures 5A, 5B, 5C:
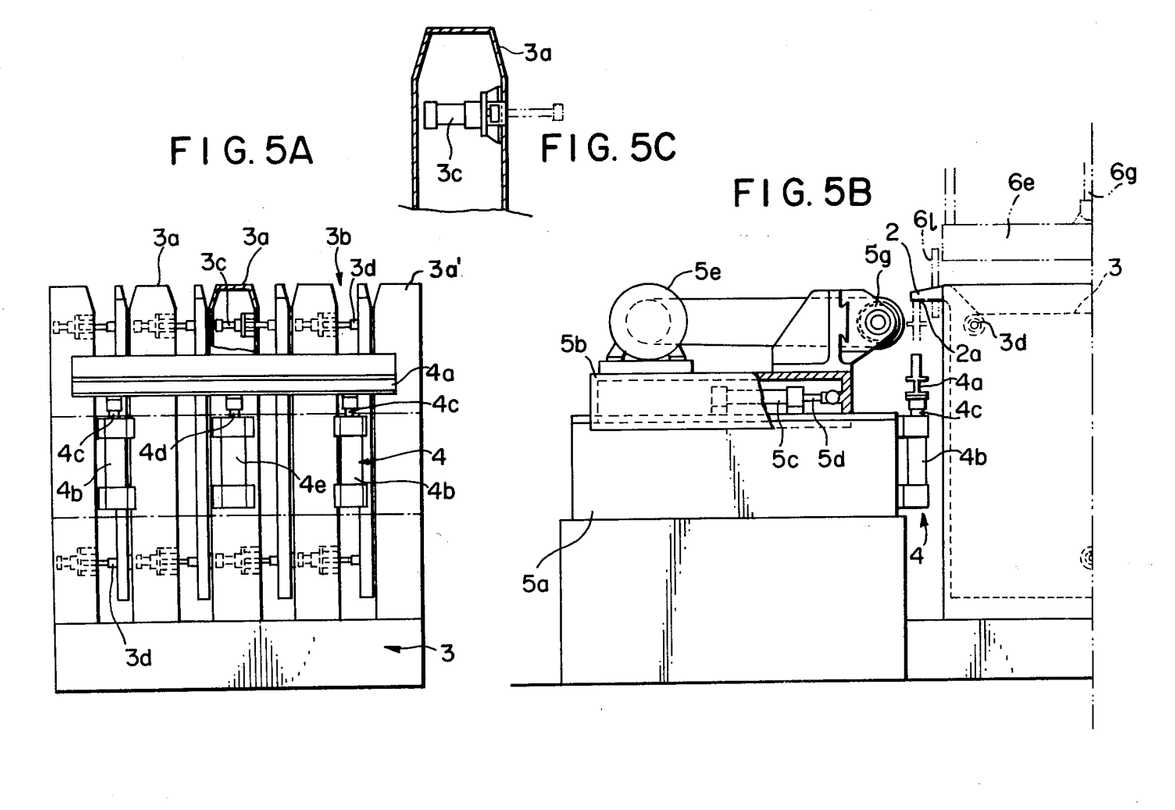
FIG. 5A is an enlarged side view of the clamping device or receptacle of FIG. 3 showing the manner of clamping the anodes in place.
FIG. 5B is an enlarged front elevational view showing the relationship between the shaping device, the anode support beams, and the transfer device.
FIG. 5C is a further enlarged partial view of a receptacle wall and a clamping device thereon.
Figure 6:
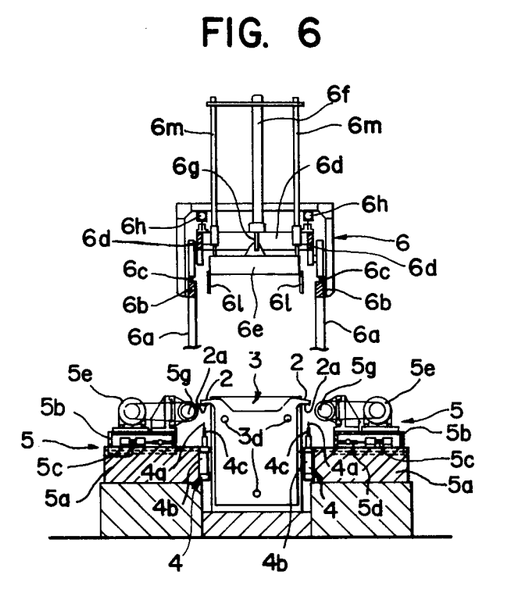
FIG. 6 is a front view showing the relative positions of the clamping device, shaping apparatus, support means and transfer means, taken substantially along line VI—VI of FIG. 4A.

As shown in FIGS. 3, 4 and 5, a plurality of vertical walls 3a having a width slightly greater than that of anodes 1 are arranged parallel to one another and are spaced apart a distance somewhat greater than the thickness of anodes 1. This distance is determined by the ease in transferring the anodes in and out of receptacle 3 and the thickness of walls 3a determined by the retracted position of cylinders 3c housed therein and by the length of piston rods 3d. The walls are interconnected at the bottom thereof so as to form a plurality of channels 3b opening upwardly and extending laterally between walls 3a. In each wall 3a except the wall 3a', three oil pressure cylinders 3c are provided in spaced-apart relation and lie perpendicular to the wall surfaces so as to be positioned at apices of a triangle (FIGS. 5B and 6). Clamping device or receptacle 3 includes piston rods 3d of oil pressure cylinders 3c protruding through the wall surface of adjacent walls 3a. Hence anodes 1 can be pinched or clamped in place within channels 3b by inserting anodes 1 vertically into channels 3b parallel to each other and pressing each anode against the surface of an adjacent wall 3a by means of piston rods 3d.

A support device 4 is provided at opposite sides of receptacle 3, as shown in FIGS. 3, 4 and 6. Support device 4 includes support beams 4a arranged horizontally adjacent walls 3a and parallel to the side edges thereof. Vertical piston rods 4c of oil pressure cylinders 4b are connected to opposite ends of the beams. Guide bars 4d are secured at one end thereof to the undersurfaces of support beams 4a and extend downwardly from support beams 4a into guide channels 4e disposed centrally of beams 4a. Support device 4 thus supports support ears 2 at the lateral sides of anodes 1 which have been transferred by the transfer device and inserted into channels 3b on the top surface of support beams 4a. Support beams 4a are raised together to a predetermined position by piston rods 4c of oil pressure cylinders 4b. Anodes 1, supported by support beams 4a, are then clamped in place by pressing them against walls 3a by protruding piston rods 3d. Piston rods 4c are then retracted into oil pressure cylinders 4b, and support beams 4a are allowed to lower so as to disengage from support ears 2 (see FIG. 5B).

Figure 9:
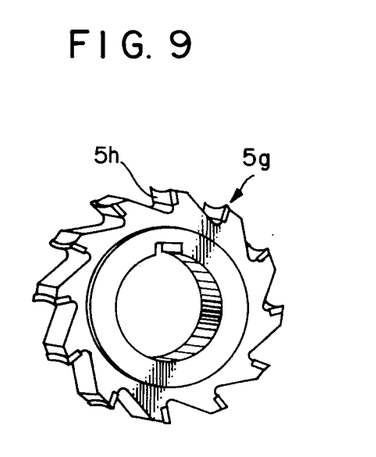
FIG. 9 is an enlarged perspective view of a typical milling cutter of the shaping devices.

As shown in FIGS. 5B and 6, anodes 1 clamped in place by device 3 are held in a condition such that support ears 2 protrude laterally outwardly from walls 3a between channels 3b. Shaping devices 5 are disposed at opposite sides of anodes 1 which are held in place by device 3. Cutter holders 5b are movable toward and away from receptacle 3 by means of oil pressure cylinders 5c fixedly mounted on beds 5a. A tongue and groove arrangement is provided at the mating surfaces of beds 5a and holders 5b in the advancing direction of holders 5b for guiding the holders along such direction. Motors 5e are fixedly mounted on holders 5b for driving shafts 5f disposed parallel to support beams 4a. Milling cutters 5g, having concave blade tips 5h as shown in FIG. 9, are attached to each shaft 5f at positions corresponding to the support ears of anodes 1 so as to shape undersurfaces 2a of ears 2 to suitable lengths. Hence, the apparatus is designed to support a number of anodes 1 by means of support beams 4a, then clamp the anodes by means of clamping device 3, allow support beams 4a to lower, allow milling cutters 5g to shape undersurfaces 2a of support ears 2 and then retract milling cutters 5g so as to disengage from the anodes.

As shown in FIGS. 4 and 6, a transfer device 6 is supported on legs 6a above clamping device 3 for inserting anodes 1 into channels 3b of clamping device 3 and for withdrawing anodes 1 from channels 3b. Beams 6b interconnect the top ends of legs 6a so as to form square frames surrounding clamping device 3, and rails 6c are provided thereon parallel to support beams 4a. A carrier 6d is mounted on rails 6c for movement from a position outwardly of one end of clamping device 3 to a position outwardly of the opposite end of clamping device 3 in a direction parallel to walls 3a. Two hanging frames 6e are disposed between beams 6b (FIG. 6) and are suspended by piston rods 6g of oil pressure cylinders 6f fixedly mounted on carrier 6d for movement vertically up and down along guide pipes 6m. Carrier 6d is movable by oil pressure cylinders 6h secured to opposite ends of beams 6b. If carrier 6d is moved to the right or to the left in FIG. 4, one of hanging frames 6e will be positioned immediately above clamping device 3 (FIG. 4A) and the other hanging frame will be positioned to the front or to the rear of clamping device 3.

Figure 7:
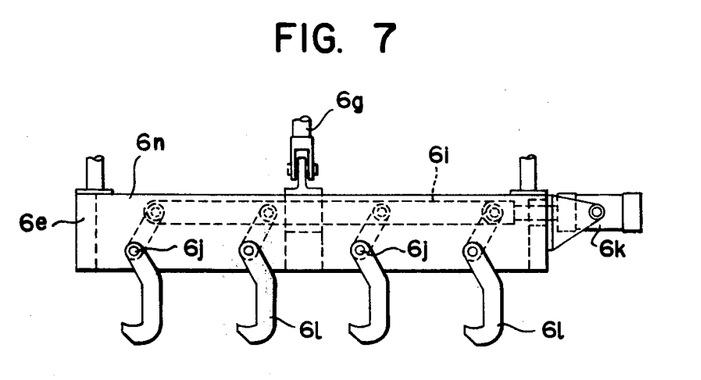
FIG. 7 is a side view of hanging frames of the transfer means.
Figure 8:
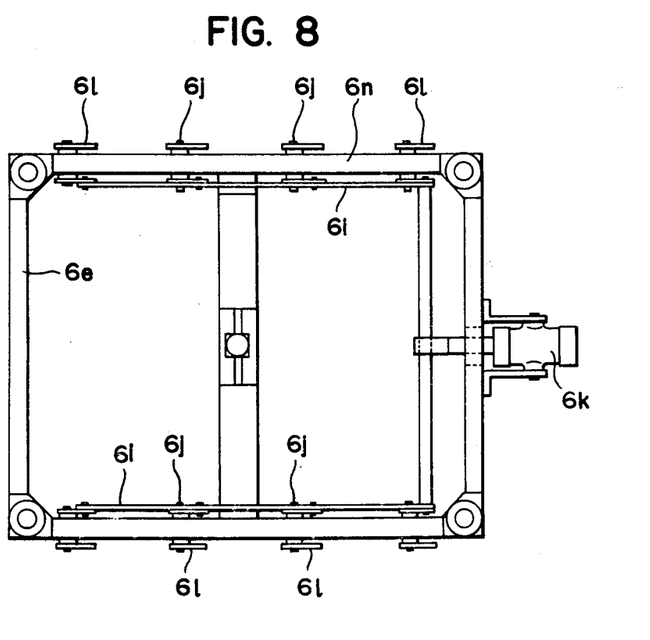
FIG. 8 is a plan view of the transfer means of FIG. 7.

As shown in detail in FIGS. 7 and 8, links 6i are arranged inwardly of frame beams 6n of each hanging frame 6e. Pins 6j are fixedly secured to hooks 6l located outwardly of beams 6n, the pins being rotatably mounted on beams 6n and being fixedly secured to short links connected to links 6i. Thus hooks 6l may be swung back and forth about the pin axes upon actuation of oil pressure 6k mounted on hanging frame 6e. Opposing pairs of hooks 6l engage support ears 2 for supporting a plurality of anodes 1 which rest on a so-called "constantly pitching" conveyor 7 provided at the front of clamping device 3. The anodes are spaced apart distances equal to the spacing of channels 3b of clamping device 3 so that, when lifted by hooks 6l of hanging frames 6e, they may be inserted into channels 3b. Opposing pairs of hooks 6l also lift the anodes from channels 3b of clamping device 3 for discharging them onto an endless discharge conveyor 8 provided at the rear of clamping device 3. Conveyor 7 and discharge conveyor 8 move and stop simultaneously and their rates of movement are equal.

Figure 10:
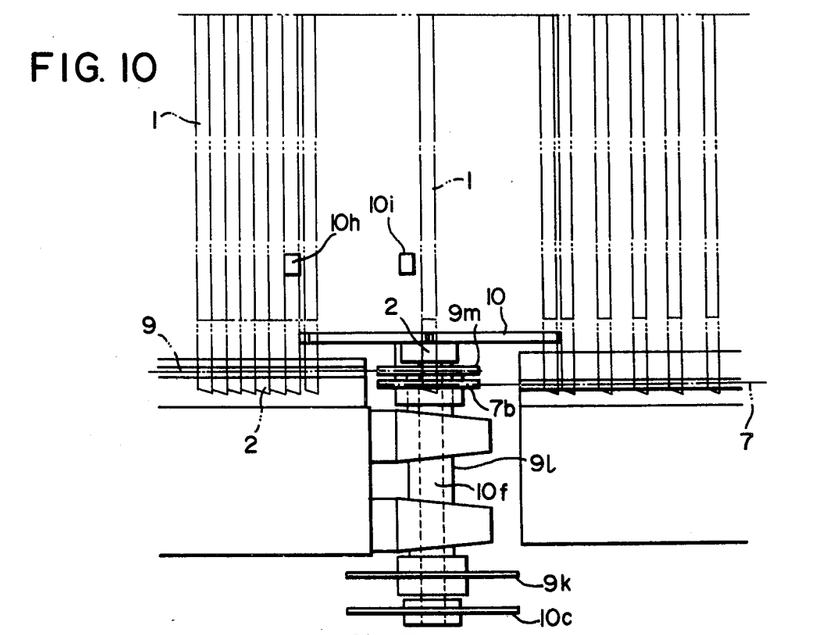
FIG. 10 is a top plan view of the feed conveyor for effecting transfer of the anodes to the clamping device.

A plurality of anodes 1 transferred by means of a forklift are mounted on a base 9b positioned at a predetermined elevation by means of a cylinder 9a. When the forklift is retracted, the anodes are carried by conveyor 9. Then, by simultaneously projecting a pair of lateral positioner devices 9c secured to the head portions of the piston rods 9o of cylinders 9n so as to orient the center of feed conveyor 9 and the center in the width direction of the anodes, base 9b is lowered and lateral positioner devices 9c are retracted by cylinders 9n, whereby the anodes are hung by their ears on feed conveyor 9 in parallel abutting relationship as seen in FIG. 10.

Referring to FIGS. 3, 4A, 10 and 11, feed conveyor 9 effects the transfer of anodes 1 by driving a motor 9d for rotating oppositely disposed sprockets 9m through sprockets 9e, 9g, 9i, 9k, chains 9f, 9j and shafts 9h, 9l. A pair of discs 10 having a larger diameter than that of sprockets 9m are disposed inwardly of and coaxially with sprockets 9m in opposite relation to each other through sprockets 10c so as to be simultaneously rotated Discs 10 are rotated by a driving motor 10a through sprockets 10b, 10c, shafts 10d, 10f and a chain 10e. Reference numeral 7b is an idle pulley, the outer periphery of which being engaged with the conveyor 7 driven by the motor.

Figure 11:
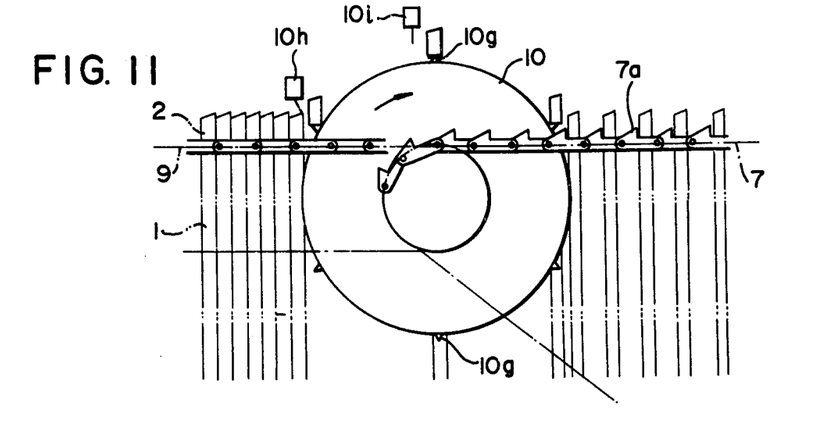
FIG. 11 is a side view of the conveyor of FIG. 10.

Each of the discs 10 is provided on its periphery with projecting triangular pawls 10g (FIG. 10) which are radially spaced equal distances apart, for example, 60°. The pawls are in registry between the discs. And, discs 10 are synchronized with conveyor 7 in such a manner as to transfer the anodes in succession onto conveyor 7, as shown in FIG. 11.

Anodes 1, which hang by their support ears along conveyor 9, are advanced toward discs 10 by motor 9d. When the first of such anodes approaches the discs before contacting discs 10, it impinges on a limit switch 10h which stops the movement of conveyor 9 and simultaneously actuates motor 10a which thereby effects rotation of the discs. Thereafter, when such anode makes contact with discs 10, the relative disposition of conveyor 9 and the discs is such that support ears 2 are lifted upwardly by pawls 10g to an uppermost position as shown in FIG. 11. However, before reaching such uppermost position, the anode impinges on a limit switch 10i which acts to stop rotation of the discs, stop movement of conveyor 7 and to again actuate feeding conveyor 9.

Thus, anodes 1 which hang by their ears on conveyor 9 are lifted upwardly one-by-one by pawls 10g depending on the alternating movement of conveyor 9 and discs 10, and are transferred onto the constantly pitching conveyor 7 by pawls 10g in such a manner that the anodes are aligned on conveyor 7 at an equal spacing. Such as equal spacing, as shown to the right in FIGS. 10 and 11, is maintained by teeth 7a provided on conveyor 7 in spaced relationship equal to the spacing of channels 3b. In other words, teeth 7a are equally spaced apart distances equal to the equal spacing between channels 3b. Thus conveyor 7 is termed "constantly pitching." When the foremost anode on conveyor 7 reaches the forward end thereof and impinges on a limit switch (not shown) provided near wuch forward end, conveyors 9 and 7 and discs 10 are stopped.

Anodes 1 are conveyed under such condition by means of feed conveyor 9 to constantly pitching conveyor 7 and, when anodes 1 are transferred from feed conveyor 9 to constantly pitching conveyor 7, anodes 1 maintain the same spaced relation to that of channels 3b.

When the same number of anodes 1 as that of channels 3b arrives immediately below transfer device 6 by means of constantly pitching conveyor 7, the movements of feed conveyor 9 and constantly pitching conveyor 7 are stopped. These conveyors are shown in more detail in Japanese Utility Model lay open Print No. 45378/1973, published June 13, 1973 and commonly owned herewith. Then, hanging frame 6e at the left side in FIG. 4 above conveyor 7 is lowered and hooks 6l are operated to engage ears 2 of anodes 1 so as to lift them, insert them into clamping device 3 and place them on support beams 4a of support device 4 (see FIG. 5B). After the completion of these operations, the operations of feed conveyor 9 and constantly pitching conveyor 7 are restarted for repeating the preceding cycle. Carrier 6d is returned to the original position and hanging frame 6e at the left side is returned above constantly pitching conveyor 7. The anodes which have been passed shift from support device 4 to device 3, are then shaped as described above by means of shaping device 5, and are then supported again by support device 4 simultaneously with release of clamping device 3. Then hanging frame 6e above constantly pitching conveyor 7, and hanging frame 6e immediately above clamping device 3, are lowered together for lifting the anodes as hooks 6l engage ears 2 thereof. It can therefore be seen that the leftward hanging frame transfers the unworked anodes supported on constantly pitching conveyor 7 to clamping device 3, and the rightward hanging frame transfers the worked anodes from clamping device 3 to discharge conveyor 8.

By precisely supporting the anodes in a predetermined position within channels 3b by means of hooks 6l, it is possible to support anodes 1 by means of the transfer device instead of the support device until anodes 1 are clamped by the clamping device, thereby avoiding the need for a support device.

In the embodiment described above, support beam 4a may be arranged for longitudinal movement and the anodes may be so conveyed that they are laid down horizontally to constantly pitching conveyor 7 and may be vertically separated on conveyor 7. In addition, transfer device 6 may comprise a hanging frame hung from a crane. Still further, the present apparatus may be employed in combination with a constantly pitching conveyor corresponding to the anode pitch in an electrolyzing cell.

To briefly summarize the operation of the apparatus according to the present invention, a plurality of the anodes, equal to the number of channels 3b of receptacle 3, are conveyed first along conveyor 9 and then along conveyor 7, conveyor 7 is then stopped so that the plurality of anodes, which are supported vertically at a predetermined spacing with their portions at the upper ends of the plates, are made to lie directly beneath the left hanging frame 6e positioned as in FIG. 4 to the leftmost end of transfer device 6. The right hanging frame 6e is, in such position, directly above receptacle 3 as shown. Cylinders 6b are then actuated to extend their piston rods 6g thereby simultaneously lowering both hanging frames sufficiently so that hooks 6l will engage the undersurfaces of ears 2 so the hooks are swung beneath the ears upon actuation of link mechanism 6i by cylinders 6k. Both hanging frames are then moved forward only to the right, when viewing FIG. 4A, until the left hanging frame lies directly above receptacle 3. Such horizontal movement is carried out by cylinders 6h. Both hanging frames are then again lowered upon actuation of their cylinders 6f for insertion of the anodes into channels 3b. Just prior to such insertion, support beams 4a are raised, by the actuation of their cylinders 4b, to a position shown in phantom outline in FIG. 5B. The anodes may then be lowered into receptacle 3 until their support ears 2 rest on the top surfaces of support beams 4a. The lower level of hanging frame 6e and hooks 6l thereof are shown in phantom outline in FIG. 5B. Cylinders 3c are then actuated to extend their piston rods 3d so as to pinch or clamp the anodes in place against the surfaces of walls 3a. Hooks 6l are then swung out of engagement with ears 2 upon actuation of link mechanism 6i, the left hanging frame is then raised, support beams 4a are lowered, and undersurfaces 2a of support ears 2 are shaped or milled by cutters 5a as cutter holders 5b are moved toward receptacle 3 upon actuation of a piston rod 5d of cylinders 5c. Upon completion of the shaping or milling operation, the cutter holders 5b are shifted away from receptacle 3 to their position shown in phantom outline in FIG. 5B, beams 4a are elevated to their phantom outline position shown in this figure, both hanging frames are moved horizontally back to their position shown in FIG. 4, both hanging frames are lowered, and hooks 6l on the right hanging frame are swung to engage ears 2 of the now-shaped anodes in receptacle 3, and hooks 6l of the left hanging frame are swung to engage the support ears of a plurality of anodes yet to be worked on and which now lie directly therebeneath on conveyor 7 as described earlier. Both hanging frames are then raised for simultaneously moving the unworked and the worked sets of anodes upwardly. Horizontal shifting of the hanging frames then transfers the finished anodes to overlie conveyor 8 and the unfinished anodes to overlie receptacle 3. Upon the lowering of the hanging frame, and a swinging of their hooks to disengage them from the support ears of the anodes, the finished sets of anodes are deposited onto conveyor 8, and the unfinished set of anodes are lowered into channels 3b of receptacle 3 in the same manner as described hereabove. The operation cycle is then repeated as detailed above. And, it should be pointed out that the hydraulic cylinders provided for lateral positioner device 9c, base 9b, transfer device 6, clamping device 3 and shaping device 5 are controlled by a hydraulic sequence control system in any normal manner.

From the foregoing, it can be seen that the apparatus according to the present invention is capable of economically and efficiently shaping the support ears of a plurality of anodes to be supplied to an electrolyzing cell on a large scale. In addition, contacting the anodes with bus bars is improved significantly to reduce cell voltage.

Obviously, many modifications and variations of the present invention are made possible in the light of the above teachings. It is therefore to be understood that within the scope of the appended claims, the invention may be practiced otherwise than as specifically described.

We claim:

1. An apparatus for shaping anodes for electrolytic refining comprising flat plates having support ears extending outwardly of a top edge and opposite side edges thereof, the apparatus comprising, a receptacle having a plurality of spaced vertical walls open at the top thereof and disposed parallel to one another for the reception of the plates betwen said walls, said walls having a predetermined width permitting the support ears of the plates to extend outwardly of opposing side edges thereof, means on said walls for clamping the plates against vertical surfaces of said walls, means including cutters movable toward and away from said opposing side edges of said walls for shaping undersurfaces of the support ears, and means for transferring the plates into said receptacle for being shaped and for transferring the shaped plates from said receptacle, means supporting said transferring means above said receptacle for vertical movement toward and away therefrom and for horizontal movement perpendicular to said walls.

2. The apparatus according to claim 1, further comprising means disposed outwardly and adjacent said opposing said edges of said walls for engaging the support ears so as to support the plates, said engaging means including vertically movable, horizontal support beams disposed parallel to said opposing side edges.

3. The apparatus according to claim 1, further comprising means disposed beneath said transferring means for conveying the plates toward and away from said receptacle.

4. The apparatus according to claim 3, wherein said conveying means includes a feed conveyor and a cooperating constantly pitching conveyor.

5. The apparatus according to claim 4, wherein said conveying means further includes means for holding the anodes located adjacent said constantly pitching conveyor, said holding means including a base member, means on said base member for raising and lowering same, and means movable toward and away from opposing side edges of said base member for arranging the anodes in uniform lateral order.

6. The apparatus according to claim 1, wherein said clamping means includes piston and cylinder units.

7. The apparatus according to claim 1, wherein said shaping means comprises a fixed support bed, a cutter holder mounted on said bed for movement toward and away from said receptacle, said cutters being mounted on said bed and having concave blade tips, and a motor on said support bed for actuating said cutters.

8. The apparatus according to claim 1, wherein said transferring means comprise fixed frames located above said receptacle, a carrier member mounted on said frame for horizontal movement perpendicular to said walls, hanging frames mounted on said carrier member for vertical movement toward and away from said receptacle and means on said hanging frames for raising and lowering the plates into and from said receptacle.

9. The apparatus according to claim 8, wherein each said hanging frame has a length substantially equal to the length of said receptacle along a direction perpendicular to said walls thereof.

10. The apparatus according to claim 8, wherein said raising and lowering means comprises a plurality of hooks located at the sides of said hanging frames, rotatably mounted pin elements extending outwardly of said sides and being fixedly secured to said hooks, a link mechanism interconnecting said pin elements, and means for moving said link mechanism to effect rotation of said pin elements and movement of said hooks.

* * * * *